June 27, 1933. F. DAVIS 1,915,981
ARC WELDING APPARATUS
Filed Dec. 31, 1931
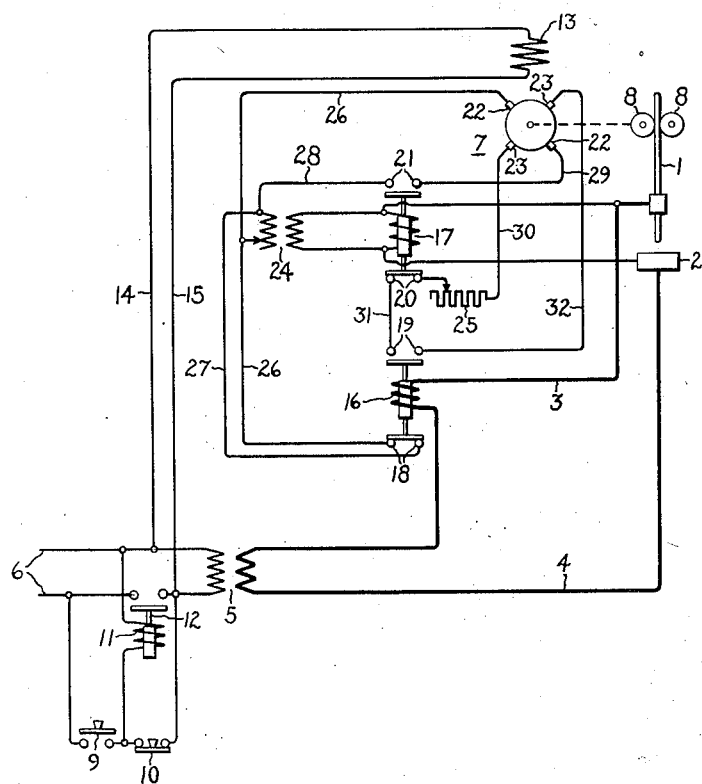
Inventor:
Fred Davis,
by Chas. V. Tullar
His Attorney.

Patented June 27, 1933

1,915,981

UNITED STATES PATENT OFFICE

FRED DAVIS, OF SAUGUS, MASSACHUSETTS, ASSIGNOR TO GENERAL ELECTRIC COMPANY, A CORPORATION OF NEW YORK

ARC WELDING APPARATUS

Application filed December 31, 1931. Serial No. 584,071.

My invention relates to improvements in arc welding apparatus in which the electrodes are moved relative to one another to strike and thereafter maintain a welding arc. Although not limited thereto, my invention is of particular utility for automatic arc welding with alternating current sources of supply.

It is an object of my invention to provide apparatus in which the electrodes are fed toward one another through the agency of a commutator motor, the brush position of which is controlled in accordance with a characteristic of the welding circuit for controlling the direction and speed of rotation of the motor to strike and thereafter maintain an arc of predetermined length.

Further objects of my invention will become apparent from the following specification taken in connection with the accompanying drawing which diagrammatically illustrates one embodiment thereof for alternating current arc welding in which a motor of the repulsion type is used for feeding the electrode.

In the drawing the welding electrodes are illustrated at 1 and 2. Electrode 1 may be in the form of a pencil or rod, and electrode 2, which cooperates therewith, may be of like construction or may comprise the work to be welded. These electrodes are connected through conductors 3 and 4 to the secondary of a welding transformer 5, the primary of which is connected to a suitable source of supply 6. Transformer 5 may be of such a design as to have a high internal reactance in order to stabilize the operation of the welding arc, or it may have a low internal reactance and the necessary stabilization secured by connecting in series therewith the usual stabilizing resistance or reactor.

The welding electrodes are fed toward one another by a feed motor 7, for example a repulsion motor, by means of which the feeding mechanism including electrode feed rolls 8 is operated to feed the electrodes toward and away from one another to strike and thereafter maintain a welding arc.

The connection of the welding circuit and the feed motor to the source of supply is under the control of push buttons 9 and 10. By depressing button 9 the operating coil 11 of line contactor 12 is energized, completing the primary circuit of the transformer 5. Upon closing, the line contactor completes its holding circuit through push button 10 which when open operates to deenergize it and disconnect the welding apparatus from the source of supply 6.

The closing of contactor 12 connects the field 13 of the feed motor 7 to the source of supply 6 through conductors 14 and 15. The armature connections of the feed motor 7 are controlled through current and voltage responsive means 16 and 17. The current responsive means 16 comprises an operating coil in series with the electrodes 1 and 2 and contacts 18 and 19 by means of which the armature circuits of the feed motor 7 are controlled. The voltage responsive means 17 comprises a relay whose operating coil is connected across the electrodes 1 and 2 and contacts 20 and 21 by means of which the armature circuits of the feed motor 7 are controlled. The feed motor is of the repulsion type and is provided with two sets of brushes 22 and 23, one of which is adjusted for one rotation of the motor and the other of which is adjusted for the reverse rotation. A transformer 24 for controlling the feeding operation of motor 7 is connected to be responsive to a characteristic of the welding arc. In the particular instance illustrated, the voltage across the electrodes 1 and 2 is employed for controlling the feeding operation. An impedance device 25 is provided for controlling the speed of reverse rotation of the feed motor 7.

The operation of the above described system is as follows: Upon closing push button 9 the line contactor 12 is closed, thereby connecting transformer 5 and welding electrodes 1 and 2 to the source of supply 6. The field 13 of the feed motor 7 is also connected to the source of supply by closure of the line contactor 12. Assuming the electrodes 1 and 2 are out of engagement with one another, the full open circuit voltage of the secondary of the welding transformer 5 is impressed upon the winding of relay 17 and the primary of the controlling transformer 24. The relay 17 will consequently operate closing contacts 21 and opening contacts 20. This completes a circuit through brushes 22 of the feed motor 7 as follows: Conductor 26, contacts 18, conductors 27 and 28, contacts 21 and conductor 29. The secondary of the control transformer 24 is short circuited through conductor 27, contacts 18 and conductor 26. The setting of brushes 22 is such that with these connections feed motor 7 operates in a direction to feed the electrodes into engagement with one another. As soon as the electrodes come together voltage responsive means 17 is deenergized and the current responsive means 16 energized. This interrupts the feed motor circuit previously traced and completes a new circuit as follows: Through brushes 23, conductor 30, impedance 25, contacts 20, conductor 31, contacts 19 and conductor 32. The setting of brushes 23 is such that with these connections the rotation of the feed motor 7 is reversed. The electrodes are therefore separated from one another, the speed of separation being determined by the value of impedance 25 which controls the motor speed. Operation of the current responsive device 16 removes the short circuit from the secondary of controlling transformer 24 which upon operation of the voltage responsive means 17 is connected in series with the brushes 22 of the feed motor 7. The connection is as follows: Through conductor 26, transformer 24, conductor 28, contacts 21 and conductor 29. The speed of the feed motor is thereafter controlled in accordance with the variations in voltage across the welding arc which is impressed on the motor circuit through the agency of the control transformer 24.

In the arrangement above described the position of the brush sets 22 and 23 was fixed. The same control however may be accomplished by employing one brush set and shifting its position on the commutator through means responsive to a characteristic of the welding circuit. In place of a repulsion motor other forms of a commutator motor may be employed without departing from my invention. The forward and reverse speeds of rotation of the feed motor may be determined by brush setting, or controlling impedances such as impedance 25 in the system above described may be used.

What I claim as new and desire to secure by Letters Patent of the United States is:

1. Arc welding apparatus comprising electrode feeding means, means including a commutator motor for operating said feeding means, means including a plurality of brushes for completing a circuit to the commutator of said motor in different positions relative to the field of said motor, and means responsive to a characteristic of the welding circuit for controlling the position in which said circuit to said commutator is completed.

2. Arc welding apparatus in which the electrodes are moved relative to one another to strike and thereafter maintain a welding arc comprising electrode feeding means, means including a commutator motor for operating said feeding means, means including a plurality of brushes for completing a circuit to the commutator of said motor in different positions relative to the field of said motor, and means responsive to a characteristic of the welding circuit for controlling the position in which said circuit to said commutator is completed and the direction of rotation of said motor for striking and thereafter maintaining an arc of predetermined length.

3. Arc welding apparatus in which the electrodes are moved toward and away from one another to strike and thereafter maintain a welding arc comprising electrode feeding means, a commutator motor for operating said feeding means, and means responsive to the current through and voltage across said electrodes for establishing a brush connection for rotation of said motor in a direction for feeding the electrodes into engagement with one another, thereafter for establishing a different brush connection for rotation of said motor in a direction to separate said electrodes and strike an arc and finally for returning to said first brush connection and applying to said motor an electromotive force that varies in accordance with the length of the welding arc for controlling the speed of rotation of said motor for feeding said electrodes toward one another at the proper rate to maintain the arc length substantially constant.

4. Arc welding apparatus in which the electrodes are moved toward and away from one another to strike and thereafter maintain a welding arc comprising an electrode feeding means, a commutator motor having one set of brushes for establishing an armature circuit for forward rotation and another set of brushes for establishing an armature circuit for reverse rotation, means for connecting said motor to said feeding means, and means for controlling the circuit connections through said sets of brushes including a winding in series with the electrodes and a winding adapted to respond to the voltage across said electrodes, said controlling means being arranged to establish a connection through one of said brush sets for feeding the electrodes toward one another when they are separated and a welding arc unestablished, thereafter to complete a circuit through another of said brush sets for separating said electrodes to strike a welding arc upon the deenergization of said voltage responsive winding and the energization of said series winding upon completion of the welding circuit through said electrodes, and finally to reestablish a connection through said first-mentioned brush set responsive to arc voltage for controlling the rate of electrode feed and establishing an arc of predetermined length.

5. Arc welding apparatus in which the electrodes are moved toward and away from one another to strike and thereafter maintain a welding arc comprising electrode feeding means, a commutator motor having one set of brushes for establishing an armature circuit for forward rotation and another set of brushes for establishing an armature circuit for reverse rotation, means for connecting said motor to said feeding means, and means responsive to the current through and voltage across said electrodes for completing a circuit through one set of brushes for rotation in a direction to feed the electrodes into engagement with one another, thereafter through another set of brushes for rotation in a direction to separate said electrodes and strike an arc and finally applying to said first set of brushes a source of electromotive force which varies in accordance with the length of the welding arc for controlling the speed of rotation in a direction to feed said electrodes toward one another at a proper rate to maintain the arc length substantially constant.

6. Arc welding apparatus in which the electrodes are moved toward and away from one another to strike and thereafter maintain a welding arc comprising electrode feeding means, a commutator motor for operating said feeding means, a transformer for controlling said motor, means for connecting said transformer in the welding circuit to be responsive to a characteristic thereof, and means responsive to the flow of welding current and the voltage across said electrodes for establishing the brush setting of said motor and controlling the connection of said transformer thereto, said means being arranged to complete a motor circuit independently of said transformer and establish a brush setting for rotation of said motor in a direction for feeding the electrodes into engagement with one another, thereafter for completing a motor circuit and establishing a different brush setting for rotation of said motor in a direction to separate said electrodes and strike an arc and finally for returning to said initial brush setting and connecting said transformer to said motor for controlling its speed of rotation in a direction for feeding said electrodes toward one another at the proper rate of speed for maintaining the arc length substantially constant.

7. Arc welding apparatus in which the electrodes are moved toward and away from one another to strike and thereafter maintain a welding arc comprising electrode feeding means, an alternating current repulsion motor having a plurality of brush sets for establishing armature circuits for forward and reverse rotation, a transformer for controlling said motor, means for connecting said transformer in the welding circuit to be responsive to a characteristic thereof, and means responsive to the welding current through and voltage across said electrodes for controlling the connections through said brush sets and said transformer, said means being arranged to complete a circuit independently of said transformer through one brush set when said current responsive means is deenergized and said volt responsive means is energized thereafter to interrupt this connection and to complete a connection through the other brush set when said current responsive means is energized and said volt responsive means is deenergized and finally to establish a circuit through said first-mentioned brush set in series with said transformer when both of said current and voltage responsive means are energized.

In witness whereof, I have hereunto set my hand.

FRED DAVIS.